United States Patent
Hayama

(10) Patent No.: US 9,043,091 B2
(45) Date of Patent: May 26, 2015

(54) VEHICLE STEERING SYSTEM

(71) Applicant: JTEKT CORPORATION, Osaka-shi, Osaka (JP)

(72) Inventor: Ryouhei Hayama, Nabari (JP)

(73) Assignee: JTEKT CORPORATION, Osaka (JP)

( * ) Notice: Subject to any disclaimer, the term of this patent is extended or adjusted under 35 U.S.C. 154(b) by 314 days.

(21) Appl. No.: 13/684,311

(22) Filed: Nov. 23, 2012

(65) Prior Publication Data

US 2013/0144493 A1   Jun. 6, 2013

(30) Foreign Application Priority Data

Dec. 2, 2011   (JP) .................................. 2011-265154

(51) Int. Cl.
| | |
|---|---|
| B62D 6/00 | (2006.01) |
| B62D 5/04 | (2006.01) |
| B62D 5/00 | (2006.01) |
| B62D 15/02 | (2006.01) |

(52) U.S. Cl.
CPC ............... B62D 6/00 (2013.01); B62D 15/021 (2013.01); B62D 5/001 (2013.01); B62D 5/0484 (2013.01); B62D 5/049 (2013.01)

(58) Field of Classification Search
CPC ........ B62D 6/00; B62D 5/049; B62D 5/0484; B62D 5/001; B62D 5/021
USPC ............ 701/36, 41–44, 29.1, 29.2, 29.7, 30.3
See application file for complete search history.

(56) References Cited

U.S. PATENT DOCUMENTS

| 6,371,239 B2 * | 4/2002 | Furumi et al. ................ 180/445 |
| 7,183,761 B2 * | 2/2007 | Watanabe et al. ........ 324/207.25 |
| 7,222,008 B2 * | 5/2007 | Takahashi et al. .............. 701/41 |
| 7,423,397 B2 * | 9/2008 | Katahira ....................... 318/432 |
| 2008/0039996 A1 * | 2/2008 | Lee ................................ 701/34 |
| 2011/0093163 A1 | 4/2011 | Byun |
| 2011/0246133 A1 * | 10/2011 | Harada et al. ................. 702/151 |

FOREIGN PATENT DOCUMENTS

| GB | 2 386 880 A | 10/2003 |
| JP | A-10-278826 | 10/1998 |
| JP | A-2004-90784 | 3/2004 |

OTHER PUBLICATIONS

Extended European Search Report issued in European Patent Application No. 12194897.0 dated Apr. 5, 2013.

* cited by examiner

Primary Examiner — Russel Frejd
(74) Attorney, Agent, or Firm — Oliff PLC

(57) ABSTRACT

When a partial malfunction is detected, a sensor malfunction determination unit changes a control mode from a first control mode to a second control mode. When the control mode is changed from the first control mode to the second control mode, a steered system motor is rotated in a direction corresponding to a rotation direction of a steering wheel immediately before the partial malfunction occurs in the angle sensor. When the absolute value of a steering angular velocity of the steering wheel exceeds a threshold, it is determined that a driver has operated the steering wheel in a direction opposite to a current steered direction, and the rotation direction of the steered system motor is reversed.

5 Claims, 6 Drawing Sheets

9,043,091 B2

VEHICLE STEERING SYSTEM

INCORPORATION BY REFERENCE/RELAXED APPLICATION

This application claims priority to Japanese Patent Application No. 2011-265154 filed on Dec. 2, 2011 the disclosure of which, including the specification, drawings and abstract, is incorporated herein by reference in its entirety.

BACKGROUND OF THE INVENTION

1. Field of the Invention

The invention relates to a vehicle steering system in which an operating member is not mechanically coupled to a steering mechanism and the steering mechanism is driven by a motor.

2. Discussion of Background

Japanese Patent Application Publication No. 2004-90784 (JP 2004-90784 A) describes a steer-by-wire system in which a steering wheel that serves as an operating member is not mechanically coupled to a steering mechanism, a steering angle of the steering wheel is detected by an angle sensor, and the driving force of a steered system motor (steering actuator) that Is controlled on the basis of an output from the angle sensor is transmitted to the steering mechanism.

In the steer-by-wire system, because there is no mechanical coupling between the steering wheel and the steering mechanism, it is possible to prevent upthrust of the steering wheel in the event of a collision of a vehicle, and it is also possible to simplify the configuration of the steering mechanism and reduce the weight of the steering mechanism. In addition, the flexibility in arrangement of the steering wheel increases, and, furthermore, operating means other than a steering wheel, for example, a lever, a pedal, or the like, may be employed.

In the steer-by-wire system, the steering wheel and the steering mechanism are not mechanically coupled to each other. Therefore, if a malfunction occurs in electrical devices such as the steered system motor and the angle sensor that detects the steering angle of the steering wheel, it is not possible to execute steering control. Therefore, there is suggested the following steer-by-wire system in which electrical devices such as steered system motors and angle sensors are provided. In the steer-by-wire system, each kind of electrical device is provided in plurality, and when a malfunction occurs in one of the electrical devices, another electrical device of the same kind with no malfunction is used instead of the malfunctioning electrical device, thereby avoiding the situation where steering is disabled. However, this configuration results in a cost increase because each kind of electrical device needs to be provided in plurality.

SUMMARY OF THE INVENTION

The invention provides a vehicle steering system that, even when a partial malfunction, which allows detection of an operation angular velocity but does not. allow detection of an operation angle of an operating member, occurs in an angle sensor that is used to detect the operation angle, is able to execute simple steering control without using another angle sensor that is used to detect the operation angle of the operating member.

According to a feature of an example of the invention, when no partial malfunction of an angle sensor is detected, a steered system motor is controlled by first control means; whereas, when a partial malfunction of the angle sensor is detected, the steered system motor is controlled by second control means. According to the control by the second control means, the steered system motor is rotated in one direction, and, each time the absolute value of an operation angular velocity that is detected on the basis of a signal output from the angle sensor exceeds a predetermined threshold, a rotation direction of the steered system motor is reversed. Thus, even when the angle sensor has a partial malfunction that allows detection of the operation angular velocity but does not allow detection of the operation angle, it is possible to execute simple steering control without using another angle sensor that is used to detect the steering angle of the operating member.

According to another feature of an example of the invention, vehicle speed detection means for detecting a vehicle speed is further provided, wherein the second control means includes rotation speed changing means for changing a rotation speed of the steered system motor on the basis of the vehicle speed that is detected by the vehicle speed detection means.

According to a further feature of an example of the invention, the second control means includes threshold changing means for changing the threshold on the basis of the vehicle speed that is detected by the vehicle speed detection means.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
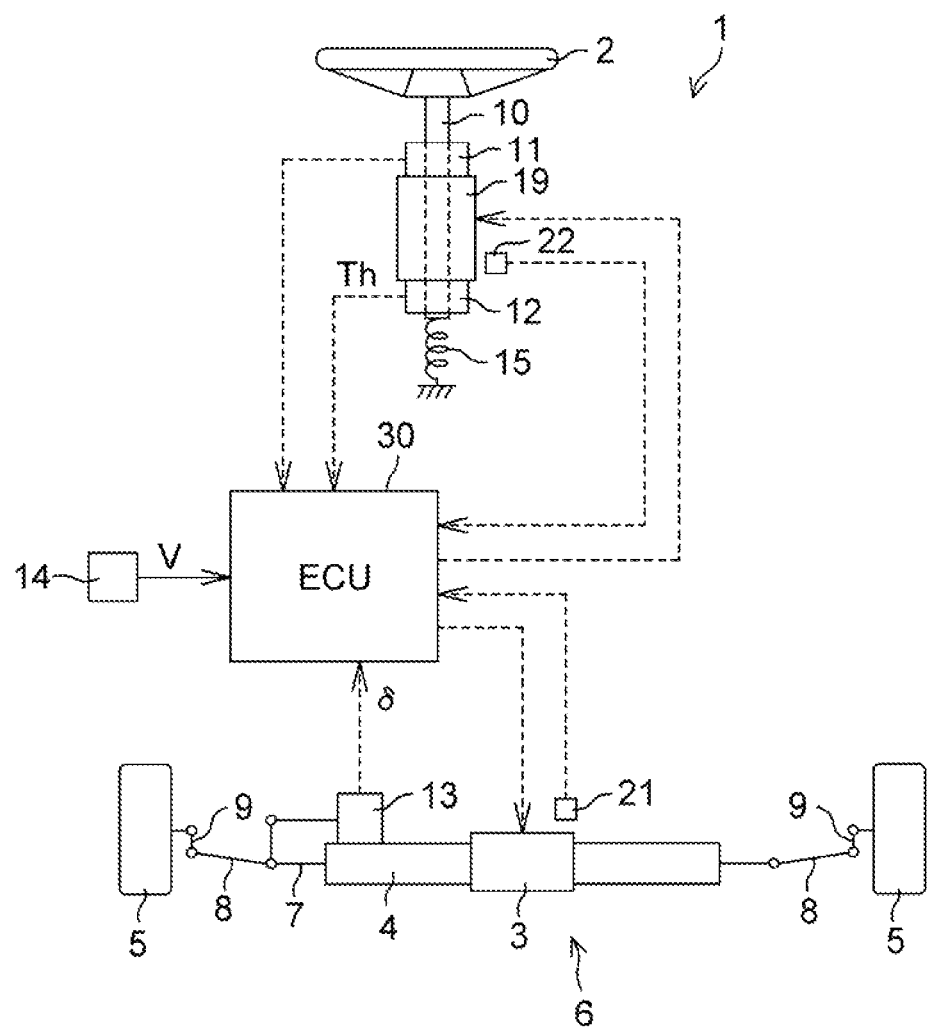
FIG. 1 is a view for illustrating the configuration of a vehicle steering system according to an embodiment of the invention.

FIG. 1 is a view for illustrating the configuration of a vehicle steering system according to an embodiment of the invention. FIG. 1 shows the configuration of a steer-by-wire system. A vehicle steering system 1 includes a steering wheel 2, a steered system motor (steering actuator) 3, and a steering gear 4. The steering wheel 2 serves as an operating member that is operated by a driver to steer a vehicle. The steered system motor 3 is driven in response to a rotational operation of the steering wheel 2. The steering gear 4 transmits the driving force of the steered system motor 3 to right and left front wheels 5 that serve as steered wheels. Between the steering wheel 2 and a steering mechanism 6 that includes, for example, the steered system motor 3, there is no mechanical coupling via which steering torque applied to the steering wheel 2 is mechanically transmitted to the steering mechanism 6. The wheels 5 are steered by executing drive control of the steered system motor 3 on the basis of an operation amount (steering angle or steering torque) of the steering wheel 2.

The steered system motor 3 is formed of a brushless motor. The steered system motor 3 is provided with a rotation angle sensor 21, such as a resolver, used to detect the rotation angle of a rotor of the steered system motor 3. The steering gear 4 has a motion conversion mechanism that converts the rotational motion of an output shaft of the steered system motor 3 into a linear motion (linear motion in the vehicle lateral direction) of a steering rod 7. The movement of the steering rod 7 is transmitted to the wheels 5 via tie rods 8 and knuckle arms 9, and the steered angle of the wheels 5 is changed. That is, the steering mechanism 6 is formed of the steered system motor 3, the steering gear 4, the steering rod 7, the tie rods 8 and the knuckle arms 9. A known steering gear may be used as the steering gear 4, and the configuration of the steering gear 4 is not limited as long as the movement of the steered system motor 3 is transmitted to the wheels 5 such that the steered angle is changed.

The following description will be provided on the assumption that the steered angle of the wheels 5 is changed in such a direction that the vehicle is steered to the left (leftward steered direction) when the steered system motor 3 is rotated in the forward rotation direction and the steered angle of the wheels 5 in such a direction that the vehicle is steered to the right (rightward steered direction) when the steered system motor 3 is rotated in the reverse rotation direction. Note that, wheel alignment is set such that, in a state where the steered system motor 3 is not driven, the wheels 5 are returned to the straight-ahead, steering position by the self-alignment torque.

The steering wheel 2 is coupled to a rotary shaft 10 that is rotatably supported on the vehicle body side. A reaction motor (reaction actuator) 19 is provided on the rotary shaft 10. The reaction motor 19 generates reaction torque (operation reaction force) that acts on the steering wheel 2. The reaction motor 19 is formed of an electric motor, such as a brushless motor, that has an output shaft integrated with the rotary shaft 10. The reaction motor 19 is provided with a rotation angle sensor 22, such as a resolver, used to detect the rotation angle (rotor angle) of a rotor of the reaction motor 19, An elastic member 15 is provided between the vehicle body and the rotary shaft 10. The elastic member 15 applies elastic force in such a direction that the steering wheel 2 is returned to the straight-ahead steering position. The elastic member 15 is, for example, formed of a spring that applies elastic force to the rotary shaft 10. When the reaction motor 19 is not applying torque to the rotary shaft 10, the steering wheel 2 returns to the straight-ahead steering position by the elastic force of the elastic member 15.

An angle sensor 11 that is used to detect the rotation angle of the rotary shaft 10 is provided in order to detect a steering angle (rotation angle) δh, or the like, of the steering wheel 2. The angle sensor 11 is an optical rotary encoder that outputs two types of pulse trains (an A-phase output signal and a B-phase output signal) having different phases on the basis of a rotation displacement of the rotary shaft 10.

In addition, a torque sensor 12 that is used to detect a torque transmitted by the rotary shaft 10 is provided in order to detect a steering torque Th applied to the steering wheel 2 by the driver. Furthermore, a steered angle sensor 13 that is used to detect the steered angle δ of the vehicle (the steered angle of the wheels 5) is provided. The steered angle sensor 13 is formed of, for example, a potentiometer that detects the amount of movement of the steering rod 7, which corresponds to the steered angle δ. The steered angle sensor 13 sets, for example, a steered angle position of the wheels 5 at the start of detection of a steered angle as a reference position, and detects an amount of change in the steered angle of the wheels 5 from the reference position as the steered angle δ. The following description will be provided on the assumption that the steered angle δ increases as the wheels 5 are steered to the left and the steered angle δ decreases when the wheels 5 are steered to the right. Therefore, the steered angle δ increases when the steered system motor 3 is rotated in the forward rotation direction, and the steered angle δ decreases when the steered system motor 3 is rotated in the reverse rotation direction. In addition, a speed sensor 14 that detects a vehicle speed V is provided.

The angle sensor 11, the torque sensor 12, the speed sensor 14 and the rotation angle sensors 21, 22 are connected to an ECU 30. The ECU 30 controls the steered system motor 3 and the reaction motor 19.

Figure 2:
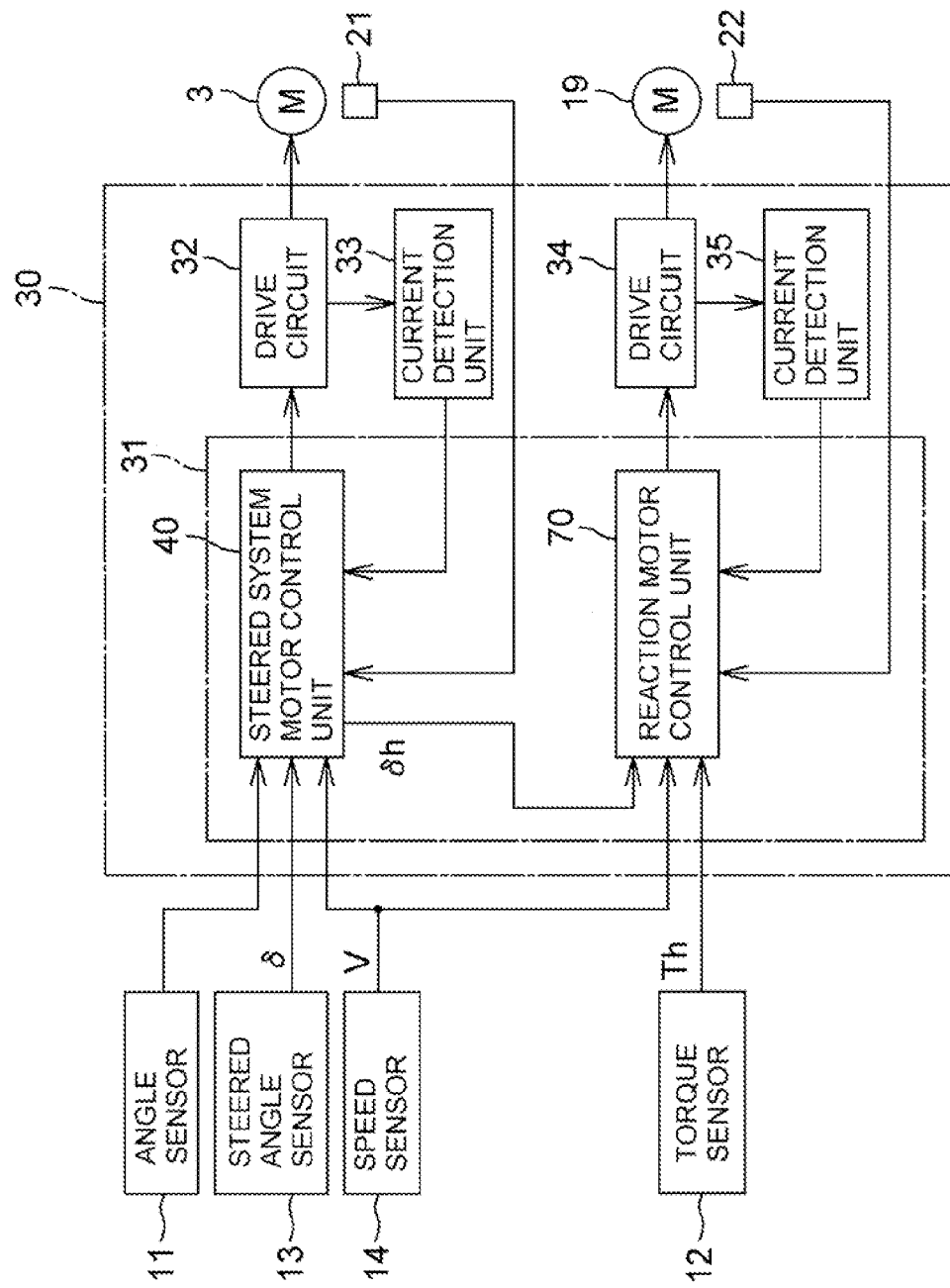
FIG. 2 is a block diagram that shows the electrical configuration of an ECU.

FIG. 2 is a block diagram that shows the electrical configuration of the ECU 30. The ECU 30 includes a microcomputer 31, a drive circuit (inverter circuit) 32, a current detection unit 33, a drive circuit (inverter circuit) 34, and a current detection unit 35. The drive circuit 32 is controlled by the microcomputer 31, and supplies electric power to the steered system, motor 3. The current detection unit 33 detects motor currents that flow through the steered system motor 3. The drive circuit 34 is controlled by the microcomputer 31, and supplies electric power to the reaction motor 19. The current detection unit 35 detects motor currents that flow through the reaction motor 19.

The microcomputer 31 includes a CPU and memories (e.g. a ROM, a RAM, a nonvolatile memory), and functions as a plurality of functional processing units by executing predetermined programs. The functional processing units include a steered system motor control unit 40 and a reaction motor control unit 70. The steered system motor control unit 40 is used to control the steered system motor 3. The reaction motor control unit 70 is used to control the reaction motor 19.

In normal times, the steered system motor control unit 40 executes steering control corresponding to a steering state by driving the steered system motor 3 via the drive circuit 32 on the basis of the vehicle speed V that is detected by the speed sensor 14. the steering angle δh that is detected based on the signal output from the angle sensor 11 and the steered angle δ that is detected by the steered angle sensor 13. When a partial malfunction (described later) occurs in the angle sensor 11, the steered system motor control unit 40 executes simple steering control by driving the steered system motor 3 via the drive circuit 32 on the basis of the vehicle speed V that is detected by the speed sensor 14, a steering angular velocity ωh that is detected based on the signal output horn the angle sensor 11, and the like.

Figure 3:
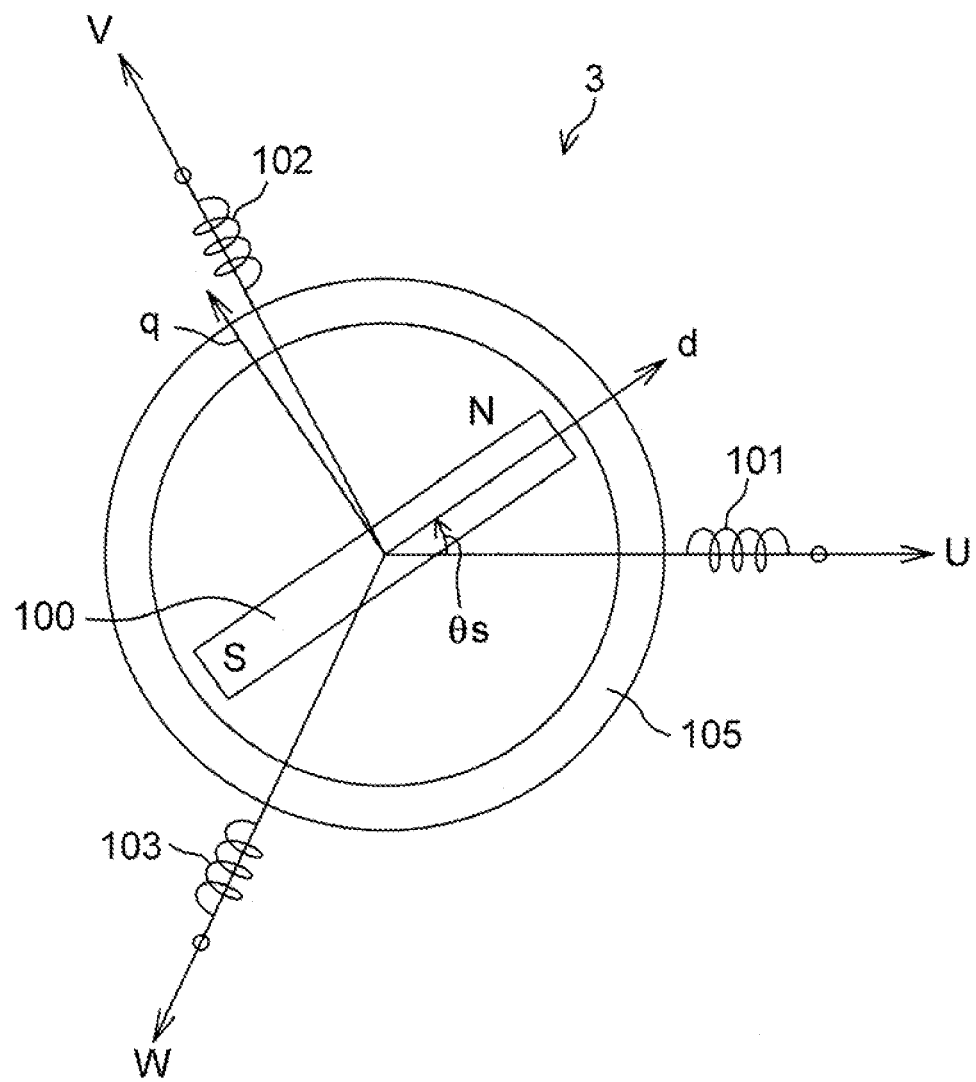
FIG. 3 is a view for illustrating the configuration of a steered system motor.

The reaction motor control unit 70 executes reaction force control corresponding to a steering state by driving the reaction motor 19 via the drive circuit 34 on the basis of the vehicle speed V that is detected by the speed sensor 14, the steering angle δh that is detected based on the signal output from the angle sensor 11 and the steering torque Th that is detected by the torque sensor 12. The steered system motor 3 is, for example, a three-phase brushless motor. As shown in FIG. 3, the steered system motor 3 includes a rotor 100 and a stator 105. The rotor 100 serves as a field magnet. The stator 105 includes a U-phase stator coil 101, a V-phase stator coil 102 and a W-phase stator coil 103. The steered system, motor 3 may be an inner rotor motor in which a stator is arranged radially outward of a rotor such that the stator faces the rotor, or may be an outer rotor motor in which a stator is arranged radially inward of a cylindrical rotor such that the stator faces the rotor.

A three-phase fixed coordinate system (UVW coordinate system) is defined by setting a U-axis, a V-axis and a W-axis in directions of the U-phase stator coil 101, the V-phase stator coil 102 and the W-phase stator coil 103, respectively. In addition, a two-phase rotating coordinate system (dq coordinate system, actual rotating coordinate system) is defined by setting a d-axis (magnetic pole axis) in a magnetic pole direction of the rotor 100 and setting a q-axis (torque axis) in a direction that is at right angles to the d-axis within a rotation plane of the rotor 100. The dq coordinate system is a rotating coordinate system that rotates together with the rotor 100. In the dq coordinate system, only a q-axis current contributes to generation of torque of the rotor 100. Therefore, a d-axis current may be set to zero and the q-axis current may he controlled on the basis of a required torque. A rotation angle of the rotor 100 (rotor angle (electric angle)) $\theta_{-S}$ is a rotation angle of the d-axis with respect to the U-axis. The dq coordinate system is an actual rotating coordinate system that rotates in accordance with the rotor angle $\theta_{-S}$. By using the rotor angle $\theta_{-S}$, it is possible to execute coordinate conversion between the UVW coordinate system and the dq coordinate system.

The reaction motor 19 is formed of, for example, a three-phase brushless motor, and has a structure similar to that of the steered system motor 3.

Figure 4:
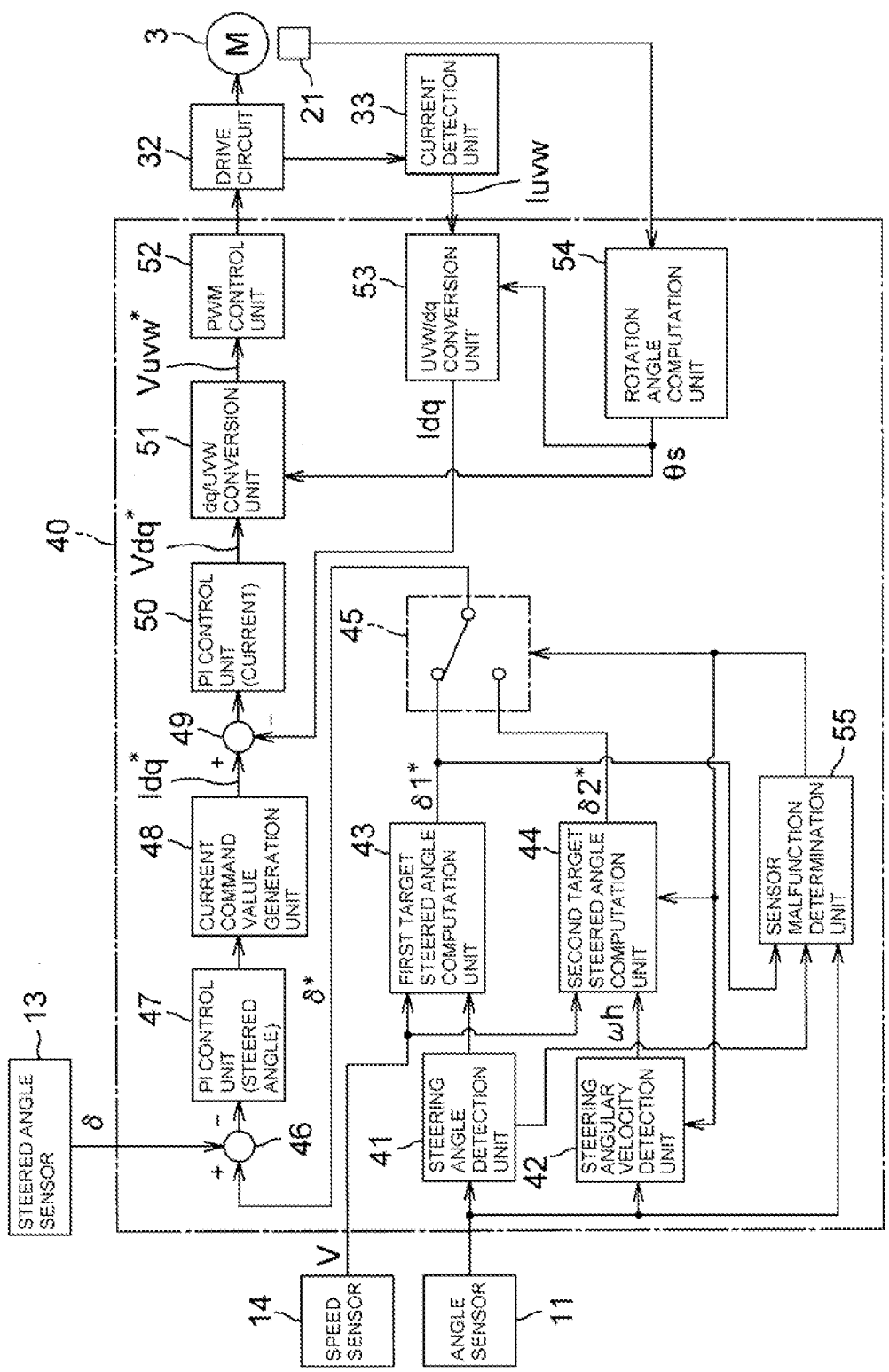
FIG. 4 is a block diagram that shows the configuration of a steered system motor control unit.

FIG. 4 is a block diagram that shows the configuration of the steered system motor control unit 40. The steered system motor control unit 40 includes a steering angle detection unit 41, a steering angular velocity detection unit 42, a first target steered angle computation unit 43, a second target steered angle computation unit 44, an angle changing unit 45, an angle deviation computation unit 46, a PI control unit 47, a current command value generation unit 48, a current deviation computation unit 49, a PI control unit 50, a dq/UVW conversion unit 51, a PWM control unit 52, a UVW/dq conversion unit 53, a rotation angle computation unit 54 and a sensor malfunction determination unit 55.

The steering angle detection unit 41 detects a steering direction (rotation direction (forward rotation or reverse rotation) of the steering wheel 2 (rotary shaft 10) on the basis of the signal output from the angle sensor 11, and detects the steering angle δh of the steering wheel 2. The following description will be provided on the assumption that the steering wheel 2 is rotated in the forward rotation direction (counter clockwise direction when viewed from the driver) when steering to the left is performed and the steering wheel 2 is rotated in the reverse rotation direction (clockwise direction when viewed from the driver) when steering to the right is performed.

The steering angle detection unit 41 sets, for example, a rotation angular position of the steering wheel 2 at the start of detection of a steering angle as a reference position, and detects a rotation amount of the steering wheel 2 from the reference position as the steering angle δh. The following description will he provided on the assumption that the steering angle δh increases when the steering wheel 2 is rotated in the forward rotation direction (leftward steering direction) and the steering angle δh decreases when the steering wheel 2 is rotated in the reverse rotation direction (rightward steering direction). The steering angle δh of the steering wheel 2, which is detected by the steering angle detection unit 41, is provided to the first target steered angle computation unit 43. The steering direction (hereinafter, referred to as "steering direction detected value") of the steering wheel 2, which is detected by the steering angle detection unit 41, is provided to the sensor malfunction determination unit 55.

The steering angular velocity detection unit 42 detects the steering angular velocity ωh of the steering wheel 2 on the basis of the A-phase output signal or the B-phase output signal from the angle sensor 11. Specifically, the steering angular velocity detection unit 42 detects the steering angular velocity ωh by counting the pulse of the A-phase output signal or the B-phase output signal at given intervals within a predetermined period. The steering angular velocity ωh of the steering wheel 2, which is detected by the steering angular velocity detection unit 42, is provided to the second target steered angle computation unit 44.

The first target steered angle computation unit 43 computes a first target steered angle δ1* based on the steering angle δh that is detected by the steering angle detection unit 41 and the vehicle speed V that is detected by the speed sensor 14 using a predetermined transfer function $K_\delta(V)$, The first target steered angle δ1* computed by the first target steered angle computation unit 43 is provided to the sensor malfunction determination unit 55 and is also transmitted to the angle changing unit 45.

The second target steered angle computation unit 44 computes a second target steered angle δ2* on the basis of the steering angular velocity ωh that is detected by the steering angular velocity detection unit 42, the vehicle speed V that is detected by the speed sensor 14, and the like. The second target steered angle δ2* computed by the second target steered angle computation unit 44 is provided to the angle changing unit 45. The angle changing unit 45 selects one of the first target steered angle δ1* that is computed by the first target steered angle computation unit 43 and the second target steered angle δ2* that is computed by the second target steered angle computation unit 44, and outputs the selected one as a target steered angle δ*. The target steered angle δ* that is output from the angle changing unit 45 is provided to the angle deviation computation unit 46.

The sensor malfunction determination unit 55 determines whether a partial malfunction occurs in the angle sensor 11. The partial malfunction is such a malfunction that allows detection of the steering angular velocity ωh but does not allow detection of the steering angle δh. Specifically, the sensor malfunction determination unit 55 monitors the A-phase output signal and the B-phase output signal from the angle sensor 11. When one of the output signals becomes abnormal, the sensor malfunction determination unit 55 determines that a partial malfunction occurs in the angle sensor 11. When both the A-phase output signal and the B-phase output signal from the angle sensor 11 become abnormal, the sensor malfunction determination unit 55 determines that the angle sensor 11 has a malfunction that does not allow detection of both the steering angle and the steering angular velocity, and then stops the operation of the steered system motor control unit 40.

When the sensor malfunction determination unit 55 determines that a partial malfunction occurs in the angle sensor 11, the sensor malfunction determination unit 55 generates a mode change command for changing the control mode from a first control mode to a second control mode. That is, when the sensor malfunction determination unit 55 determines that there is no partial malfunction in the angle sensor 11 (in normal times), the sensor malfunction determination unit 55 sets the control mode to the first control mode. On the other hand, when the sensor malfunction determination unit 55 determines that a partial malfunction occurs in the angle sensor 11 (in the event of a partial malfunction), the sensor malfunction determination unit 55 changes the control mode from the first control mode to the second control mode.

The mode change command from the sensor malfunction determination unit 55 is provided to the angle changing unit 45, the steering angular velocity detection unit 42 and the second target steered angle computation unit 44. In the first control mode, the angle changing unit 45 selects and outputs the first target steered angle δ1* as the target steered angle δ*. On the other hand, in the second control mode, the angle changing unit 45 selects and outputs the second target steered angle δ2* as the target steered angle δ*.

In addition, when the sensor malfunction determination unit 55 detects a partial malfunction of the angle sensor 11, the sensor malfunction determination unit 55 provides an abnormal signal identification signal that indicates which of the A-phase output signal and the B-phase output signal is abnormal to the steering angular velocity detection unit 42 together with the mode change command. When the steering angular velocity detection unit 42 receives the mode change command and the abnormal signal identification signal from the sensor malfunction determination unit 56, the steering angular velocity detection unit 42 detects the steering angular velocity ωh on the basis of the normal one of the A-phase output signal and the B-phase output, signal from the angle sensor 11.

In addition, the sensor malfunction determination unit 55 stores the steering direction detected value that is provided from the steering angle detection unit 41 and the first target steered angle δ1* that is provided from the first target steered angle computation unit 43 in the memory when the control mode is the first control mode. The steering direction detected values and the first target steered angles δ1* for a predetermined period are stored in the memory. When the sensor malfunction determination unit 55 detects a partial malfunction of the angle sensor 11, the sensor malfunction determination unit 55 provides the second target steered angle computation unit 44 with the steering direction detected value detected by the steering angle detection unit 41 immediately before the partial malfunction of the angle sensor 11 is detected and the first target steered angle δ1* computed by the first target steered angle computation unit 43.

When the second target steered angle computation unit 44 receives the steering direction of the steering wheel 2 and the first target steered angle δ1* together with the mode change command from the sensor malfunction determination unit 55, the second target steered angle computation unit 44 computes the second target steered angle δ2* on the basis of the received steering direction and first target steered angle δ1*, the steering angular velocity ωh that is detected by the steering angular velocity detection unit 42 and the vehicle speed V that is detected by the speed sensor 14. The details of the operation of the second target steered angle computation unit 44 will be described later.

The rotation angle computation, unit 54 computes the rotation angle (electric angle; hereinafter, referred to as "rotor angle $\theta_S$") of the rotor of the steered system motor 3 on the basis of the signal output from the rotation angle sensor 21. The angle deviation computation unit 46 computes a deviation between the target steered angle δ* that is output from the angle changing unit 45 and the steered angle δ that is detected by the steered angle sensor 13. The PI control unit 47 performs PI computation on the angular deviation computed by the angle deviation computation unit 46.

The current command value generation unit 48 generates values of currents that should be supplied to coordinate axes of the dq coordinate system as current command values on the basis of the result of computation executed by the PI control unit 47. Specifically, the current command value generation unit 48 generates a d-axis current command value $I_d^*$ and a q-axis current command value $I_q^*$ (hereinafter, collectively referred to as "two-phase current command values $I_{dq}^*$" where appropriate). More specifically, the current command value generation unit 48 sets the q-axis current command value $I_q^*$ to a significant value, and sets the d-axis current command value $I_d^*$ to zero. More specifically; the current command value generation unit 48 generates the q-axis current command value $I_q^*$ on the basis of the result of computation executed by the PI control unit 47. The two-phase current command values $I_{dq}^*$ generated by the current command value generation unit 48 are provided to the current deviation computation unit 49.

The current detection unit 33 detects a U-phase current $I_U$, V-phase current $I_V$ and W-phase current $I_W$ of the steered system motor 3 (hereinafter, collectively referred to as "three-phase detected currents $I_{UVW}$" where appropriate). The three-phase detected currents $I_{UVW}$ detected by the current detection unit 33 are provided to the UVW/dq conversion unit 53. The UVW/dq conversion unit 53 converts the three-phase detected currents $I_{UVW}$ (U-phase current $I_U$, V-phase current $I_V$ and W-phase current $I_W$) in the UVW coordinate system, which are detected by the current detection unit 33, into the two-phase detected currents $I_d$ and $I_q$ (hereinafter, collectively referred to as "two-phase detected currents $I_{dq}$" where appropriate) in the dq coordinate system. The two-phase detected currents $I_{dq}$ are provided to the current deviation computation unit 49. The rotor angle $\theta_S$ computed by the rotation angle computation unit 54 is used for coordinate conversion in the UVW/dq conversion unit 53.

The current deviation computation unit 49 computes a deviation between the two-phase current command values $I_{dq}^*$ that are generated by the current command value generation unit 48 and the two-phase detected currents $I_{dq}$ that are provided from the UVW/dq conversion unit 53. More specifically, the current deviation computation unit 49 computes a deviation of the d-axis detected current $I_d$ from the d-axis current command value $I_d^*$ and a deviation of the q-axis detected current $I_q$ from the q-axis current command value $I_q^*$. These deviations are provided to the PI control unit 50.

The PI control unit 50 generates two-phase voltage command values $V_{dq}^*$ (a d-axis voltage command value $V_d^*$ and a q-axis voltage command value $V_q^*$) that should be applied to the steered system motor 3 by performing PI computation on the current deviations computed by the current deviation computation unit 49. The two-phase voltage command values $V_{dq}^*$ are provided to the dq/UVW conversion unit 51. The dq/UVW conversion unit 51 converts the two-phase voltage command values $V_{dq}^*$ into three-phase voltage command values $V_{UVW}^*$. The rotor angle $\theta_S$ computed by the rotation angle computation unit 54 is used for the coordinate conversion. The three-phase voltage command values $V_{UVW}^*$ are formed of a U-phase voltage command value $V_U^*$, a V-phase voltage command value $V_V^*$ and a W-phase voltage command value $V_W^*$. The three-phase voltage command values $V_{UVW}^*$ are provided to the PWM control unit 52.

The PWM control unit 52 generates a U-phase PWM control signal, a V-phase PWM control signal and a W-phase PWM control signal having duty ratios that respectively correspond to the U-phase voltage command, value $V_U^*$, the V-phase voltage command value $V_V^*$ and the W-phase voltage command value $V_W^*$ and provides the U-phase PWM control signal, the V-phase PWM control signal and the W-phase PWM control signal to the drive circuit 32. The drive circuit 32 is formed of a three-phase (corresponding to a U phase, a V phase and a W phase) inverter circuit. Power elements that constitute the inverter circuit are controlled by the PWM control signals provided from the PWM control unit 52. Thus, voltages that correspond to the three-phase voltage command values $V_{UVW}*$ are applied to the respective phase stator coils 101, 102, 103 of the steered system motor 3.

The angle deviation computation unit 46 and the PI control unit 47 constitute angle feedback control means. Due to the function of the angle feedback control means, the steered angle δ of the wheels 5 is controlled so as to approach the target steered angle δ*. In addition, the current deviation computation unit 49 and the PI control unit 50 constitute current feedback control means. Due to the function of the current feedback control means, motor currents that flow through the steered system motor 3 are controlled so as to approach the two-phase current command values $I_{dq}*$ generated by the current command value generation unit 48.

Figure 5:
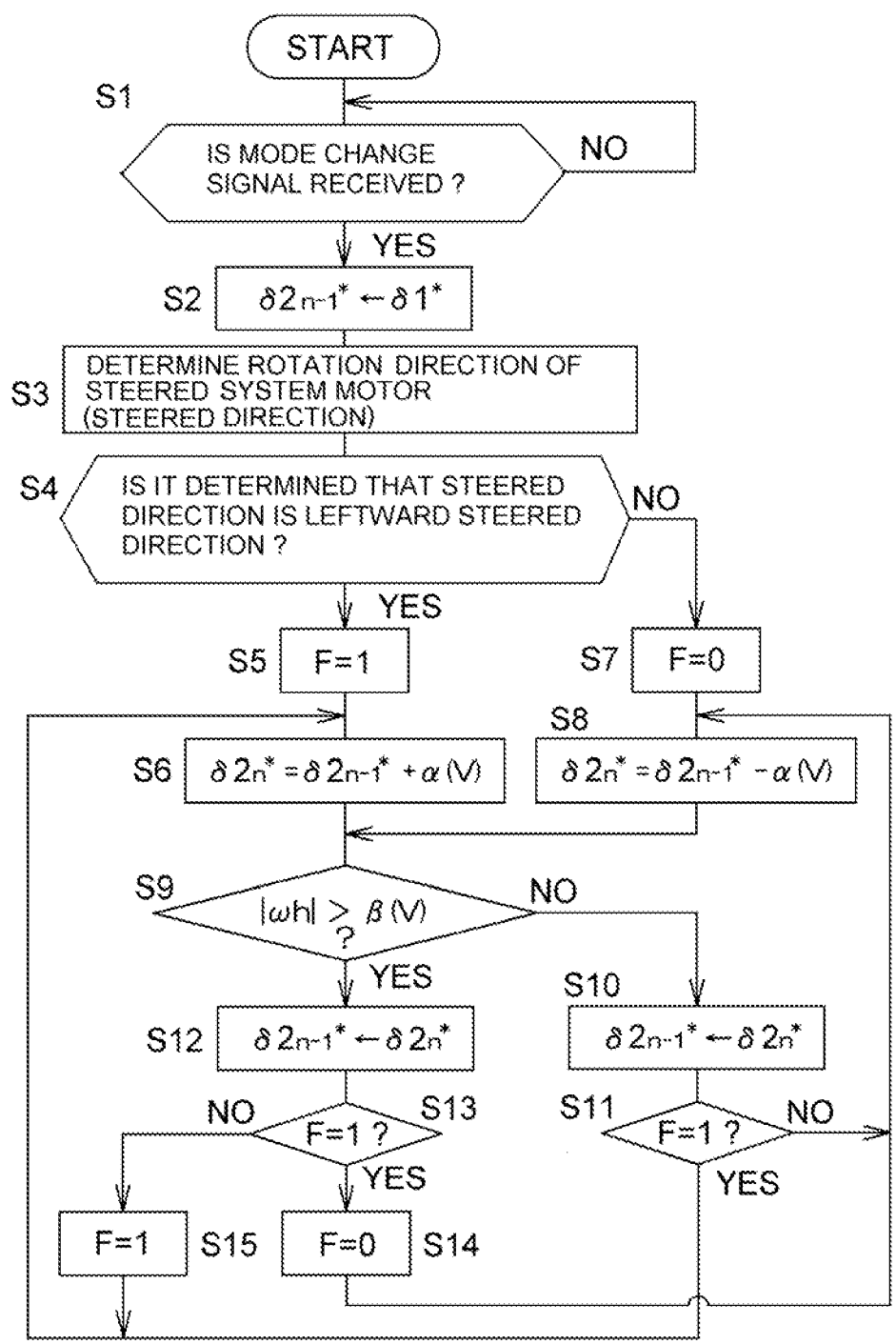
FIG. 5 is a flowchart that shows an operation of a second target steered angle computation unit.

FIG. 5 is a flowchart that shows an operation of the second target steered angle computation unit 44. When the second target steered angle computation unit 44 receives the steering direction detected value immediately before the partial malfunction of the angle sensor 11 is detected and the first target steered angle δ1* together with the mode change command from the sensor malfunction determination unit 55 (step S1), the second target steered angle computation unit 44 sets the received first target steered angle δ1* as an immediately preceding second target steered angle $δ2_{n-1}*$ (step S2).

Subsequently, the second target steered angle computation unit 44 determines a rotation direction in which the steered system motor 3 should be rotated (hereinafter, referred to as "the rotation direction of the steered system motor 3") on the basis of the received steering direction detected value (step S3). That is, the second target steered angle computation unit 44 determines a steered direction. Specifically, the second target steered angle computation unit 44 sets the rotation direction of the steered system motor 3 to the forward rotation direction (leftward steered direction) when the received steering direction detected value indicates the forward rotation direction (leftward steering direction), and sets the rotation direction of the steered system motor 3 to the reverse rotation direction (rightward steered direction) when the received steering direction detected value indicates the reverse rotation direction (rightward steering direction). Thus, the rotation direction of the steered system motor 3 (steered direction) is set to a direction corresponding to the steering direction immediately before the partial malfunction occurs in the angle sensor 11.

When the rotation direction of the steered system motor 3 is set to the forward rotation direction (leftward steered direction) (YES in step S4), the second target steered angle computation unit 44 sets a flag for storing the rotation direction of the steered system motor 3 (steered direction) (F=1) (step S5). Then, the second target steered angle computation unit 44 computes a current second target steered angle $δ2_n*$ according to Equation 1 indicated below, and provides the current second target steered angle $δ2_n*$ to the angle changing unit 45 (step S6). After that, the process proceeds to step S9.

$$δ2_n* = δ2_{n-1}* + α(V)$$ Equation 1

In Equation 1, $α(V)$ (>0) is a steered speed control value that is used to control a steered speed, and is changed on the basis of the vehicle speed V. Specifically, as the vehicle speed V becomes higher, the steered speed control value $α(V)$ is set to a smaller value. Thus, as the vehicle speed V becomes higher, the steered speed is decreased. The steered speed control value $α(V)$ is set to such a value that the steered angular velocity falls within a predetermined range having, for example, 90 deg/s as a central value. When the second target steered angle $δ2_n*$ is computed according to Equation 1, the second target steered angle $δ2_n*$ increases. Therefore, the steered system motor 3 Is rotated in the forward rotation direction (leftward steered direction) at a rotation speed that corresponds to the magnitude of the steered speed control value $α(V)$, $$δ2_n* = δ2_{n-1}* - α(V)$$ Equation 2

When the second target steered angle $δ2_n*$ is computed according to Equation 2, the second target steered angle $δ2_n*$ decreases. Therefore, the steered system motor 3 is rotated in the reverse rotation direction (rightward steered direction) at a rotation speed that corresponds to the magnitude of the steered speed control value $α(V)$, In step S9, the second target steered angle computation unit 44 determines whether the absolute value |ωh| of the steering angular velocity ωh that is detected by the steering angular velocity detection unit 42 is larger than a threshold $β(V)$. The threshold $β(V)$ (>0) is changed on the basis of the vehicle speed V. Specifically, as the vehicle speed V becomes higher, the threshold $β(V)$ is set to a smaller value. The threshold $β(V)$ is set so as to fell within a predetermined range having, for example, 500 deg/s as a central value.

When the absolute value |ωh| of the steering angular velocity ωh is smaller than or equal to the threshold $β(V)$ (NO in step S9), the second target steered angle computation unit 44 sets the currently set current second target steered angle $δ2_n*$ as the immediately preceding second target steered angle $δ2_{n-1}*$ (step S10), and then determines whether the flag F is set (F=1) (step S11). When the flag F is set (YES in step S11), the process returns to step S6 in order to rotate the steered system motor 3 while keeping the current rotation direction (leftward steered direction). On the other hand, when the flag F is reset (NO in step S11), the process returns to step S8 in order to rotate the steered system motor 3 while keeping the current rotation direction (rightward steered direction).

When it is determined in step S9 that the absolute value |ωh| of the steering angular velocity ωh is larger than the threshold $β(V)$ (YES in step S9), the second target steered angle computation unit 44 determines that the steering wheel 2 is operated in a direction opposite to the current steered direction, and executes process for reversing the steered direction. That is, the second target steered angle computation unit 44 first sets the currently set current second target steered angle $δ2_n*$ as the immediately preceding second target steered angle $δ2_{n-1}*$ (step S12), and then determines whether the flag F is set (F=1) (step S13). When the flag F is set (YES in step S13), the second target steered angle computation unit 44 resets the flag F (F=0) (step S14), and then the process proceeds to step S8 in order to rotate the steered system motor 3 in a direction (rightward steered direction) opposite to the current rotation direction (leftward steered direction). In this way, the steered direction is reversed.

On the other hand, when the flag F is reset (NO in step S13), the second target steered angle computation unit 44 sets the flag F (F=1) (step S15), and then the process proceeds to step S6 in order to rotate the steered system motor 3 in a direction (leftward steered direction) opposite to the current rotation direction (rightward steered direction). In this way, the steered direction is reversed.

In the first control mode, feedback control is executed such that the first target steered angle δ1* (=δ*) that is computed by the first target steered angle computation unit 43 converges to the steered angle δ that is detected by the steered angle sensor 13. That is, in the first control mode, appropriate steering control corresponding to a steering state is executed by controlling the steered system motor 3 using the first target steered angle δ1* (=δ*) that is computed on the basis of the steering angle δh that is detected by the steering angle detection unit 41 and the vehicle speed V that is detected by the speed sensor 14, and the steered angle δ that is detected by the steered angle sensor 13.

On the other hand, in the second control mode, feedback control is executed such that the second target steered angle δ2* (=δ*) that is computed by the second target steered angle computation unit 44 converges to the steered angle δ that is detected by the steered angle sensor 13, That is, when the control mode is changed from the first control mode to the second control mode, the steered system motor 3 is rotated in a direction corresponding to the steering direction of the steering wheel 2 immediately before the partial malfunction occurs in the angle sensor 11. At this time, the rotation speed (steered speed) of the steered system motor 3 is decreased as the vehicle speed V becomes higher. As a result, it is possible to suppress an increase in change in the steered angle when the vehicle speed V is high.

When the absolute value of the steering angular velocity ωh of the steering wheel 2 exceeds the threshold β(V), it is determined that the driver has operated the steering wheel 2 in a direction opposite to the current steered direction and therefore the rotation direction of the steered system motor 3 (steered direction) is reversed. In this case as well, the rotation speed (steered speed) of the steered system motor 3 is decreased as the vehicle speed V becomes higher. Note that the threshold β(V) is set to a smaller value as the vehicle speed V becomes higher. Thus, the rotation direction of the steered system motor 3 (steered direction) is reversed more easily as the vehicle speed V becomes higher.

After the rotation direction of the steered system motor 3 is reversed, when the absolute value of the steering angular velocity ωh of the steering wheel 2 exceeds the threshold β(V), it is determined that the driver has operated the steering wheel 2 in a direction opposite to the current steered direction and therefore the rotation direction of the steered system motor 3 is reversed. Such operations are repeatedly performed. Therefore, even when a partial malfunction occurs in the angle sensor 11, it is possible to execute simple steering control. As a result, when a partial malfunction occurs in the angle sensor 11, for example, traveling along a straight road and a lane change to a side strip are allowed.

Figure 6:
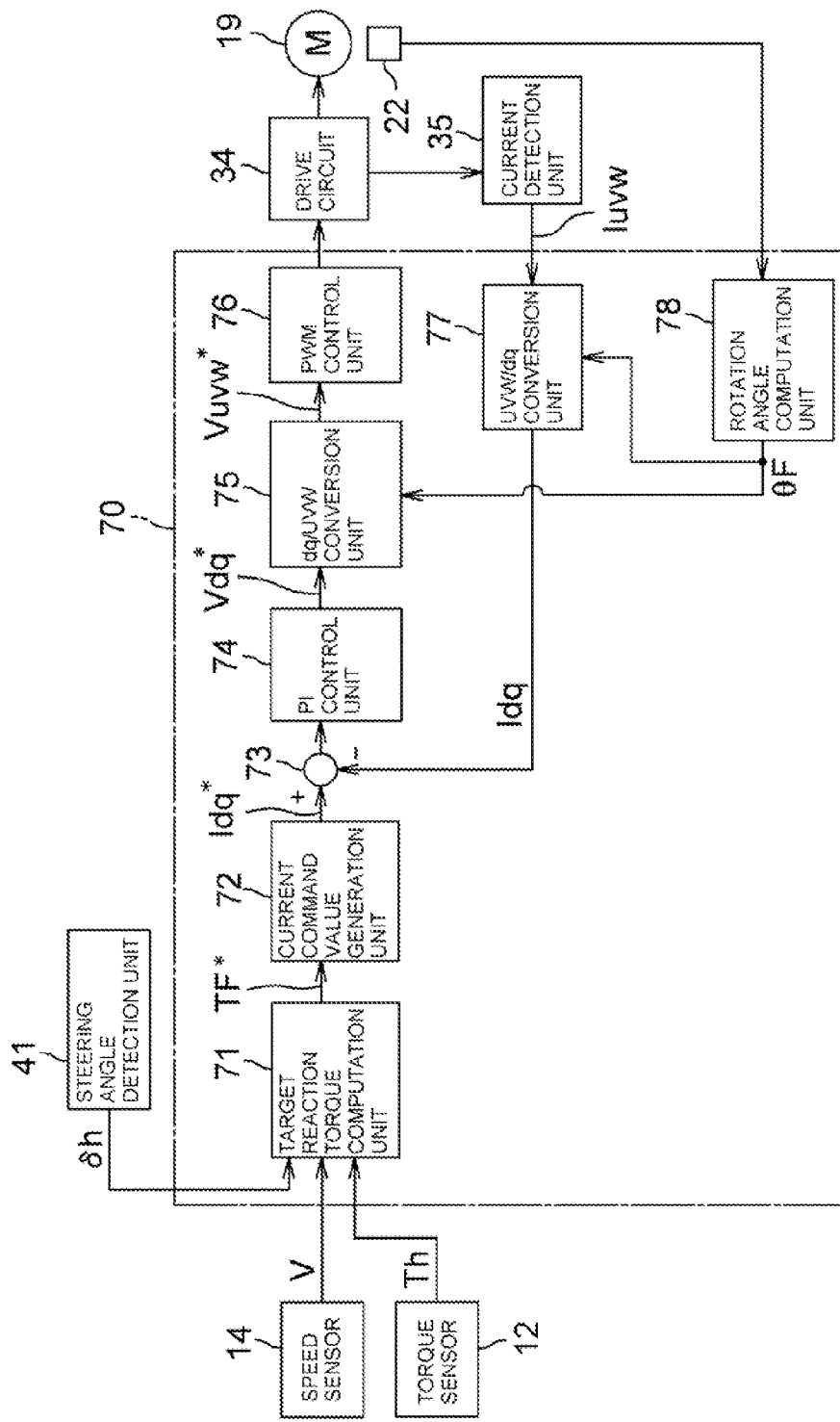
FIG. 6 is a block diagram that shows the configuration of a reaction motor control unit.

FIG. 6 is a block diagram that shows the configuration of the reaction motor control unit 70. The reaction motor control unit 70 includes a target reaction torque computation unit 71, a current command value generation unit 72, a current deviation computation unit 73, a proportional-integral (PI) control unit 74, a dq/UVW conversion unit 75, a PWM control unit 76, a UVW/dq conversion unit 77 and a rotation angle computation unit 78. The rotation angle computation unit 78 computes the rotation angle (electric angle; hereinafter, referred to as "rotor angle $\theta_F$") of the rotor of the reaction motor 19 on the basis of the signal output from the rotation angle sensor 22.

The target reaction torque computation unit 71 computes a target reaction torque $T_F^*$ on the basis of the vehicle speed V that is detected by the speed sensor 14, the steering angle δh that is detected by the steering angle detection unit 41 of the steered system motor control unit 40 and the steering torque Th that is detected by the torque sensor 12. For example, the target reaction torque computation unit 71 computes the target reaction torque $T_F^*$ by obtaining a target reaction torque basic value on the basis of the steering angle δh and the vehicle speed V and then multiplying the target reaction torque basic value by a gain that corresponds to the steering torque Th.

The current command value generation unit 72 generates values of currents that should be supplied to coordinate axes of the dq coordinate system as current command values on the basis of the target reaction torque $T_F^*$ computed by the target reaction torque computation unit 71. Specifically, the current command value generation unit 72 generates a d-axis current command value $i_d^*$ and a q-axis current command value $i_q^*$ (hereinafter, collectively referred to as "two-phase current command values $i_{dq}^*$" where appropriate). More specifically, the current command value generation unit 72 sets the q-axis current command value $i_q^*$ to a significant value, and sets the d-axis current command value $i_d^*$ to zero. More specifically, the current command value generation unit 72 generates the q-axis current command value $i_q^*$ on the basis of the target reaction torque $T_F^*$ computed by the target reaction torque computation unit 71. The two-phase current command values $i_{dq}^*$ generated by the current command value generation unit 72 are provided to the current deviation computation unit 73.

The current detection unit 35 detects a U-phase current $i_U$, V-phase current $i_V$ and W-phase current $i_W$ (hereinafter, collectively referred to as "three-phase detected currents $i_{UVW}$" where appropriate) of the reaction motor 19. The three-phase detected currents $i_{UVW}$ detected by the current detection unit 35 are provided to the UVW/dq conversion unit 77. The UVW/dq conversion unit 77 converts the three-phase detected currents $i_{UVW}$ (U-phase current $i_U$, V-phase current $i_V$ and W-phase current $i_W$) in the UVW coordinate system, which are detected by the current detection unit 35, into the two-phase detected currents $i_d$ and $i_q$ (hereinafter, collectively referred to as "two-phase detected currents $i_{dq}$" where appropriate) in the dq coordinate system. The two-phase detected currents $i_{dq}$ are provided to the current deviation computation unit 73. The rotor angle $\theta_F$ computed by the rotation angle computation unit 78 is used for coordinate conversion executed by the UVW/dq conversion unit 77.

The current deviation computation unit 73 computes a deviation between the two-phase current command values $i_{dp}^*$ that are generated by the current command value generation unit 72 and the two-phase detected currents $i_{dq}^*$ that are provided from the UVW/dq conversion unit 77. More specifically, the current deviation computation unit 73 computes a deviation of the d-axis detected current $i_d^*$ from the d-axis current command value $i_d^*$ and a deviation of the q-axis detected current $i_q^*$ from the q-axis current command value $i_q^*$. The deviations are provided to the PI control unit 74.

The PI control unit 74 generates two-phase voltage command values $V_{dq}^*$ (a d-axis voltage command value $v_d^*$ and a q-axis voltage command value $v_q^*$ which are the values of voltages that should be applied to the reaction motor 19, by performing PI computation on the current deviations computed by the current deviation computation unit 73. The two-phase voltage command values $v_{dq}^*$ are provided to the dq/UVW conversion unit 75. The dq/UVW conversion unit 75 converts the two-phase voltage command values $v_{dq}^*$ into three-phase voltage command values $v_{UVW}^*$. The rotor angle $\theta_F$ computed by the rotation angle computation unit 78 is used for the coordinate conversion. The three-phase voltage command values $v_{UVW}^*$ are formed of a U-phase voltage command value $v_U^*$, a V-phase voltage command value $V_V^*$ and a W-phase voltage command value $v_W^*$. The three-phase voltage command values $v_{UVW}^*$ are provided to the PWM control unit 76.

The PWM control unit 76 generates a U-phase PWM control signal a V-phase PWM control signal and a W-phase PWM control signal having duty ratios that respectively correspond to the U-phase voltage command value $v_U^*$ the V-phase voltage command value $v_V^*$ and the W-phase voltage command value $v_W^*$ and provides the U-phase PWM control signal, the V-phase PWM control signal and the W-phase PWM control signal to the drive circuit 34. The drive circuit 34 is formed of a three-phase (corresponding to a U phase, a V phase and a W phase) inverter circuit. Power elements that constitute the inverter circuit are controlled by the PWM control signals that are provided from the PWM control unit 76. Thus, voltages that correspond to the three-phase voltage command values $v_{UVW}*$ are applied to the phase stator coils of the reaction motor 19.

The current deviation computation unit 73 and the PI control unit 74 constitute current feedback control means. Due to the function of the current feedback control means, motor currents that flow through the reaction motor 19 are controlled so as to approach the two-phase current command values $i_{dq}*$ generated by the current command value generation unit 72.

The embodiment of the invention is described above. However, the invention may be implemented in other embodiments. For example, in the above-described embodiment, immediately after the control mode is changed from the first control mode to the second control mode, the steered system motor 3 is rotated in a direction corresponding to the rotation direction of the steering wheel 2 immediately before the partial malfunction occurs in the angle sensor 11. Alternatively, the steered system motor 3 may be rotated in a predetermined rotation direction.

In addition, in the above-described embodiment, the steered speed control value α(V) is changed on the basis of the vehicle speed V. Alternatively, the steered speed control value α(V) may be a fixed value set in advance. Similarly, the threshold β(V) is changed on the basis of the vehicle speed V. Alternatively, the threshold β(V) may be a fixed value set in advance.

In addition, in the above-described embodiment, the steered system motor control unit 40 computes the target steered angle and executes control (position control) of the steered system motor 3 such that the actual steered angle becomes equal to the target steered angle. Alternatively, the steered system motor control unit 40 may compute a target steered speed and may execute control (speed control) of the steered system motor 3 such that an actual steered speed becomes equal to the target steered speed.

In addition, the PI control units 47, 50, 74 each may be a PID control unit that executes proportional-integral-derivative (PID) control.

What is claimed is:

1. A vehicle steering system in which an operating member that is operated for steering is not mechanically coupled to a steering mechanism and the steering mechanism is driven by a steered system motor, comprising:

an angle sensor configured to detect an operation angle of the operating member and an operation angular velocity of the operating member;

a malfunction detection unit configured to detect occurrence of a partial malfunction in the angle sensor, the partial malfunction being such a malfunction that allows detection of the operation angular velocity of the operating member but does not allow detection of the operation angle of the operating member;

a first control unit configured to control the steered system motor using the operation angle that is detected based on a signal output from the angle sensor when no partial malfunction of the angle sensor is detected by the malfunction detection unit; and a second control unit configured to control the steered system motor such that the steered system motor is rotated in one direction and, each time an absolute value of the operation angular velocity that is detected based on a signal output from the angle sensor exceeds a predetermined threshold, a rotation direction of the steered system motor is reversed, when the partial malfunction in the angle sensor is detected by the malfunction detection unit.

2. The vehicle steering system according to claim 1, further comprising:

a vehicle speed detection unit configured to detect a vehicle speed, wherein the second control unit includes a rotation speed changing unit configured to change a rotation speed of the steered system motor based on the vehicle speed that is detected by the vehicle speed detection unit.

3. The vehicle steering system according to claim 1, further comprising:

a vehicle speed detection unit configured to detect a vehicle speed, wherein the second control unit includes a threshold changing unit configured to detect a threshold based on the vehicle speed that is detected by the vehicle speed detection unit.

4. The vehicle steering system according to claim 2, wherein the second control unit includes a threshold changing unit configured to change a threshold based on the vehicle speed that is detected by the vehicle speed detection unit.

5. The vehicle steering system according to claim 1, wherein the second control unit includes a rotation direction determination unit configured to determine a rotation direction of the steered system motor immediately after the partial malfunction in the angle sensor is detected by the malfunction detection unit based on an operation direction of the operating member immediately before the partial malfunction in the angle sensor is detected by the malfunction detection unit.

* * * * *